United States Patent
Vasudeva

(10) Patent No.: US 10,596,693 B2
(45) Date of Patent: Mar. 24, 2020

(54) POWER TOOL WITH DETACHABLE AUXILIARY HANDLE

(71) Applicant: Kailash C. Vasudeva, Waterloo (CA)

(72) Inventor: Kailash C. Vasudeva, Waterloo (CA)

( * ) Notice: Subject to any disclaimer, the term of this patent is extended or adjusted under 35 U.S.C. 154(b) by 438 days.

(21) Appl. No.: 15/403,252

(22) Filed: Jan. 11, 2017

(65) Prior Publication Data

US 2017/0197306 A1 Jul. 13, 2017

Related U.S. Application Data

(60) Provisional application No. 62/277,261, filed on Jan. 11, 2016.

(51) Int. Cl.
| | |
|---|---|
| *B25F 5/02* | (2006.01) |
| *B25B 23/16* | (2006.01) |
| *B25B 23/00* | (2006.01) |
| *B23Q 11/00* | (2006.01) |

(52) U.S. Cl.
CPC .......... *B25F 5/027* (2013.01); *B23Q 11/0046* (2013.01); *B23Q 11/0071* (2013.01); *B25B 23/0035* (2013.01); *B25B 23/0078* (2013.01)

(58) Field of Classification Search
CPC .......... B25F 5/006; B25F 5/024; B25F 5/026; B25G 1/08; B23Q 1/0071
USPC ....................................................... 81/490
See application file for complete search history.

(56) References Cited

U.S. PATENT DOCUMENTS

| | | | |
|---|---|---|---|
| 5,049,012 A | 9/1991 | Cavedo | |
| 6,820,523 B1 | 11/2004 | Chen | |
| 7,000,709 B2 | 2/2006 | Milbourne | |
| 8,407,860 B2 * | 4/2013 | Brennenstuhl | B25F 5/026 16/422 |
| 8,967,923 B2 | 3/2015 | Lerch et al. | |
| 9,956,659 B2 * | 5/2018 | Takeuchi | B23Q 11/0046 |
| 2003/0029284 A1 * | 2/2003 | Malchus | B25B 15/04 81/490 |
| 2003/0079581 A1 * | 5/2003 | Beauchamp | B25F 5/029 81/490 |
| 2005/0204878 A1 * | 9/2005 | Hu | B25G 1/046 81/490 |
| 2010/0005629 A1 * | 1/2010 | Di Nicolantonio | B25F 5/026 16/426 |
| 2010/0116104 A1 * | 5/2010 | Hung | B25G 1/085 81/490 |
| 2011/0001207 A1 | 1/2011 | Takase et al. | |

(Continued)

*Primary Examiner* — Andrew M Tecco
*Assistant Examiner* — Eyamindae C Jallow

(57) ABSTRACT

A power tool with an auxiliary handle which is easily securable to and removable from the tool. The auxiliary handle provides additional functionality, beyond being merely a handle. The auxiliary handle is detachably engaged to the power tool for working as a side handle via a "quick-connect" mechanism, which locks the handle in place either automatically or with a simple movement, and which can be released by a simple movement. The handle also serves a secondary function. For example, its quick-connect mechanism can be so configured as to receive a screwdriver bit. When removed from the power tool, the handle can act as a screwdriver handle. The handle may include compartments or slots to retain a variety of screwdriver bits or other components. The handle could be a screwdriver with auto lock bit or bit holder.

10 Claims, 19 Drawing Sheets

(56) References Cited

U.S. PATENT DOCUMENTS

2014/0138114 A1* 5/2014 Takeuchi ........... B23Q 11/0046
173/198
2014/0223695 A1* 8/2014 Rieger ................... B25F 5/006
16/421

* cited by examiner

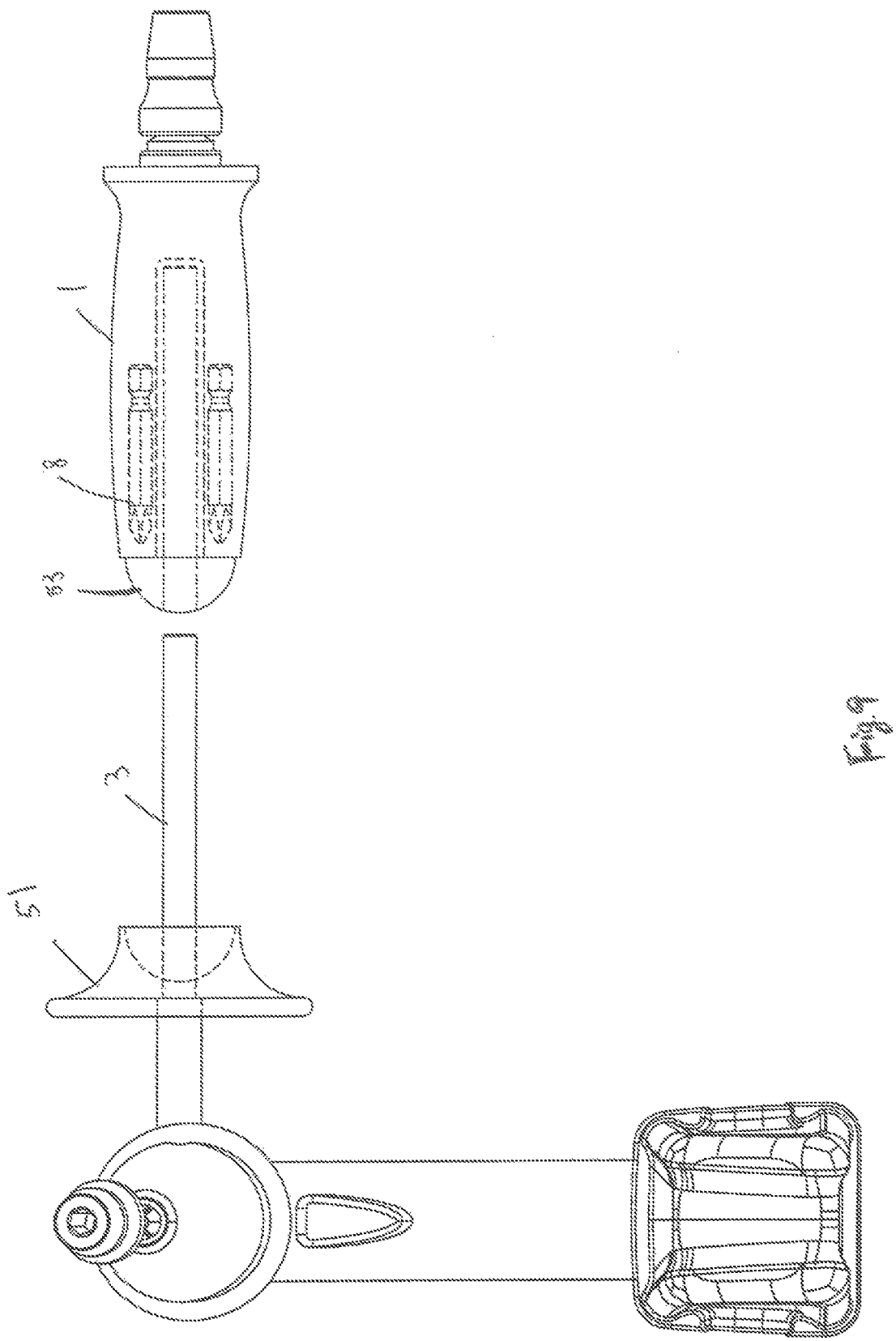

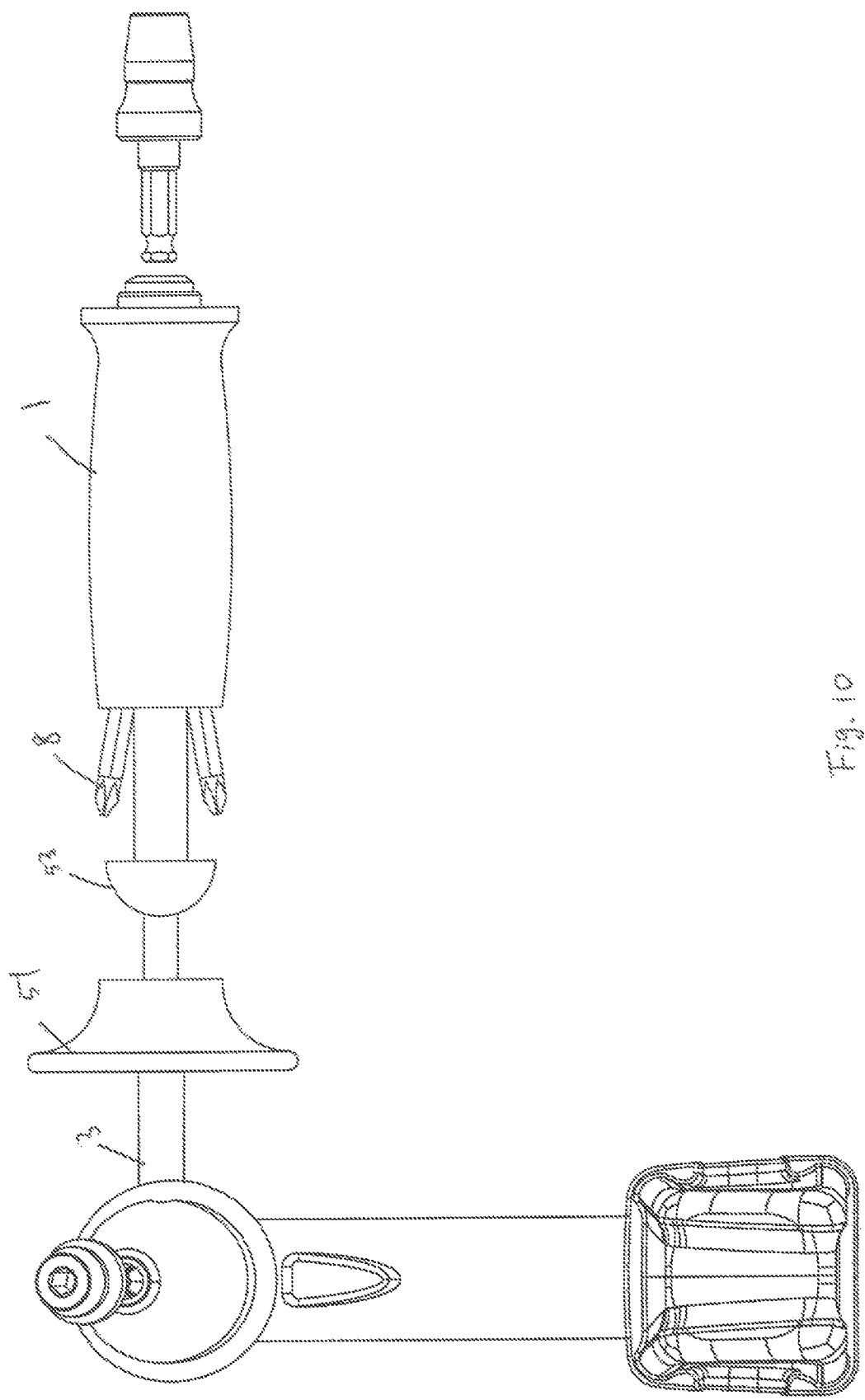

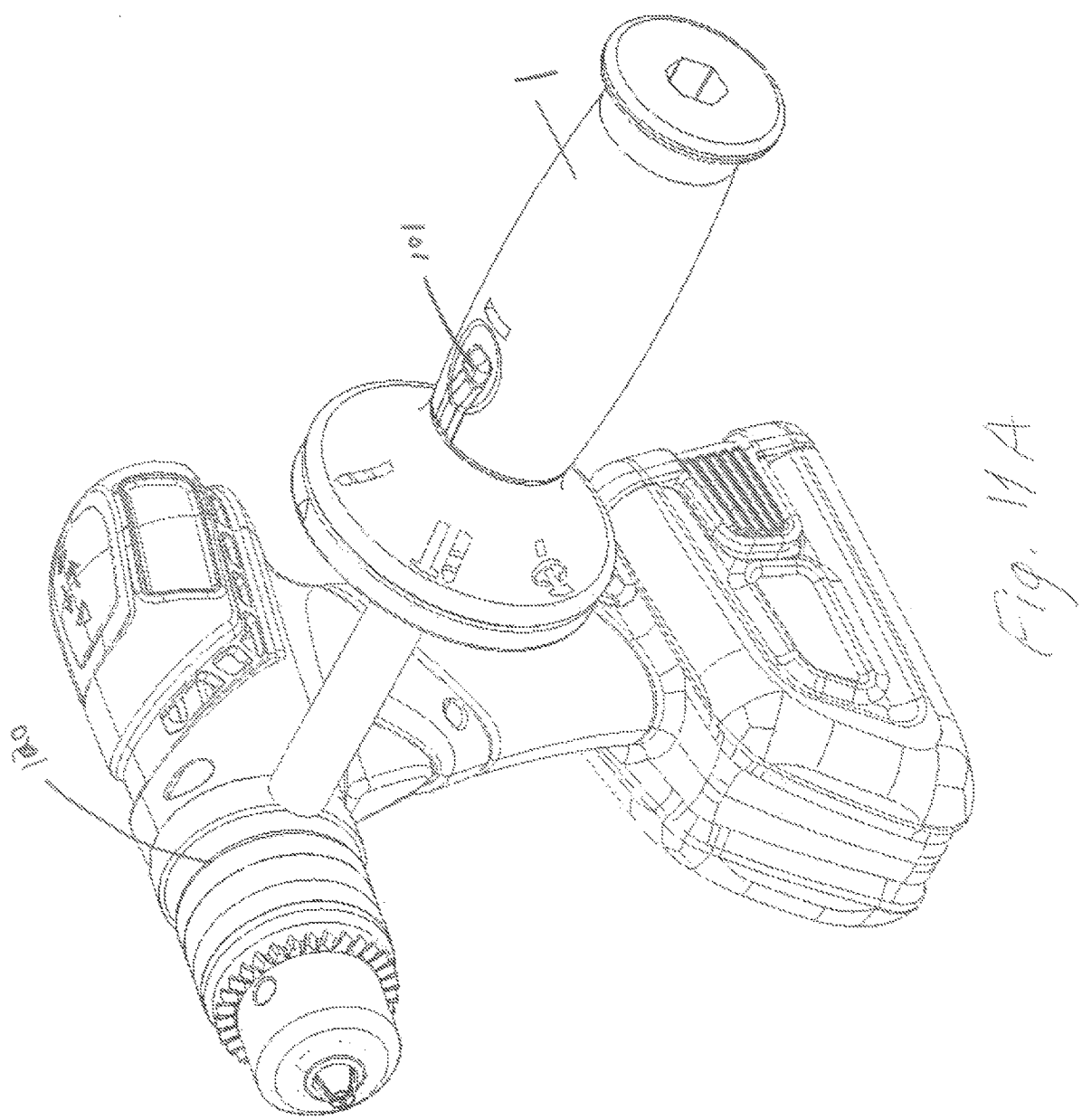

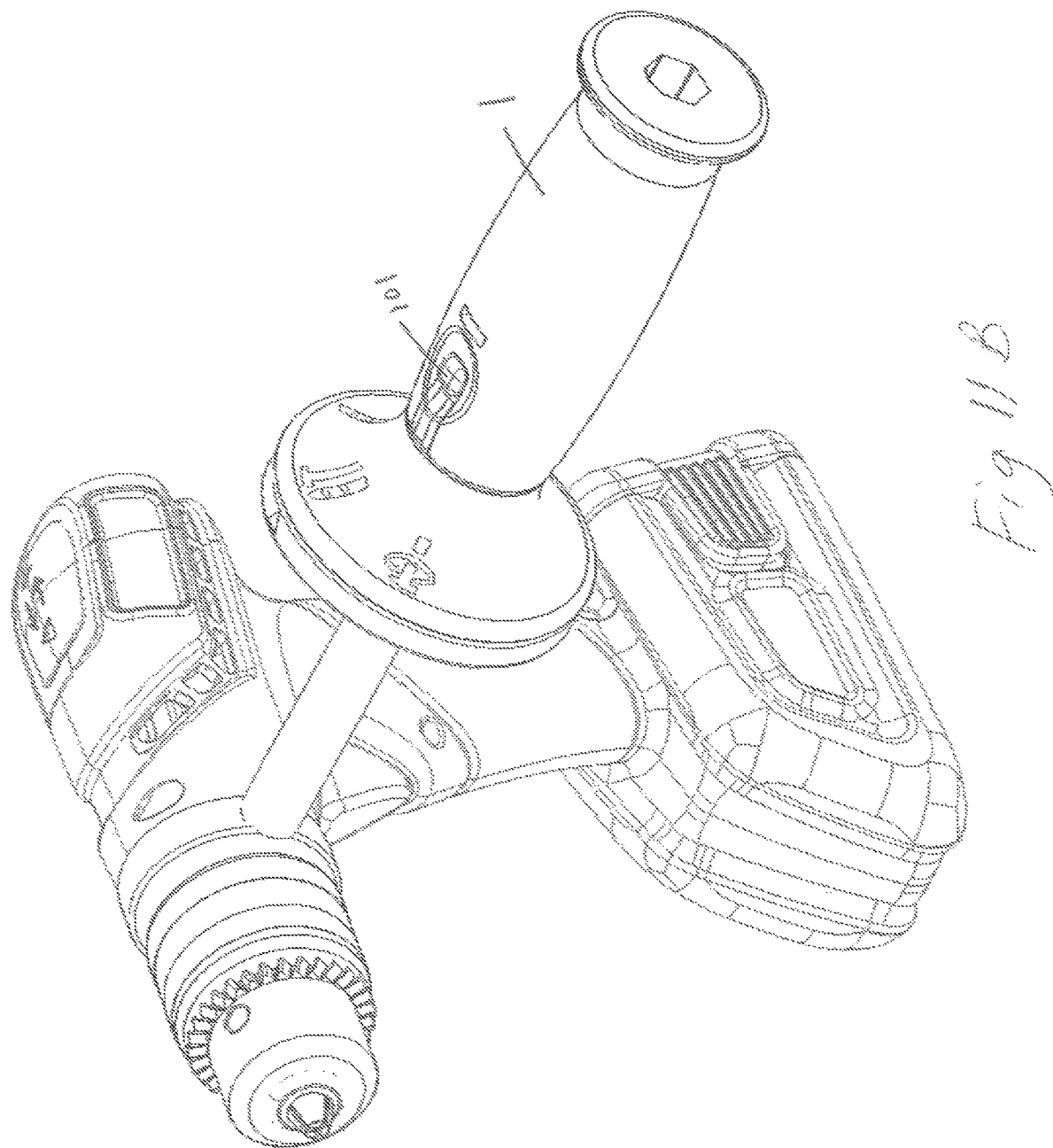

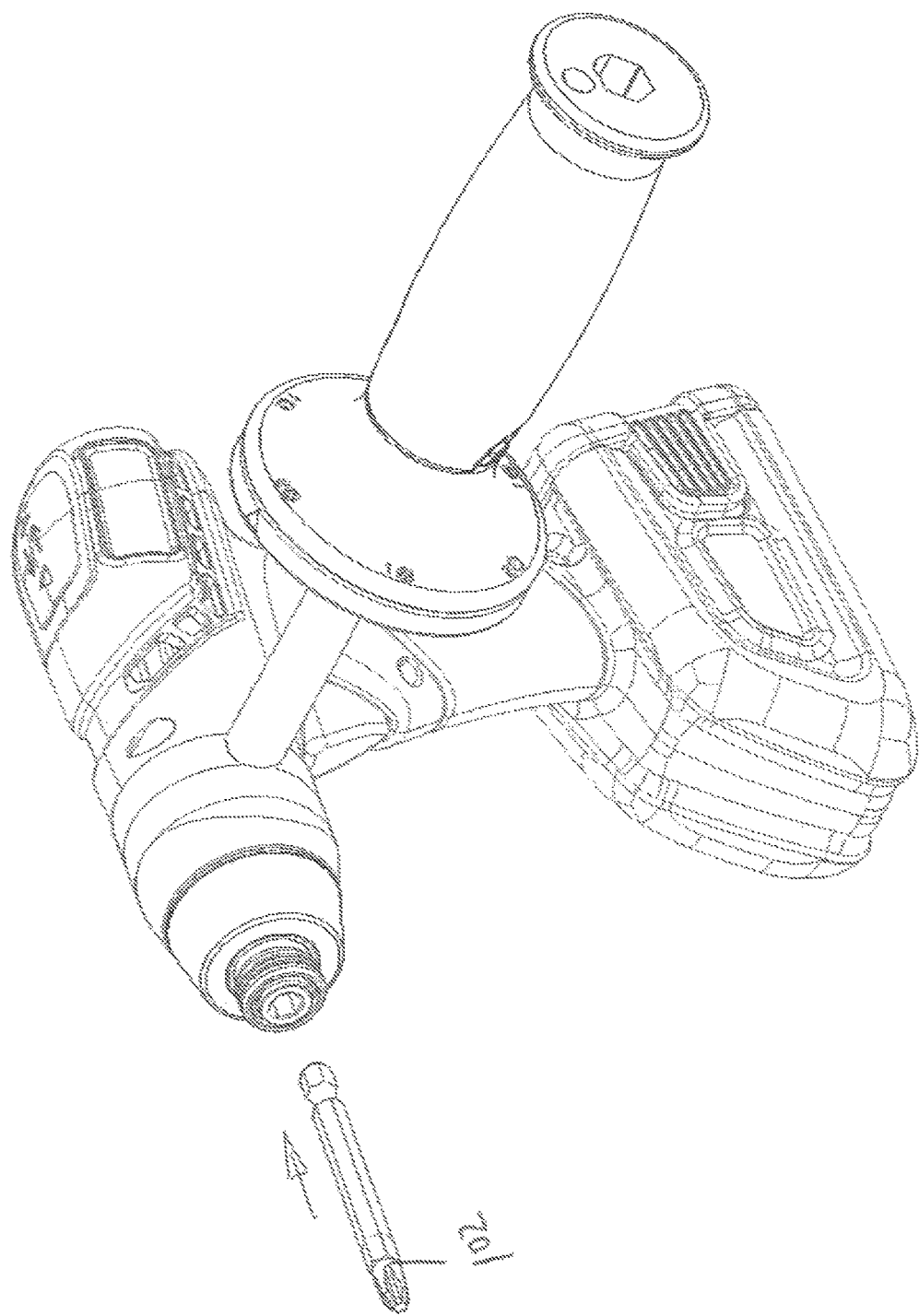

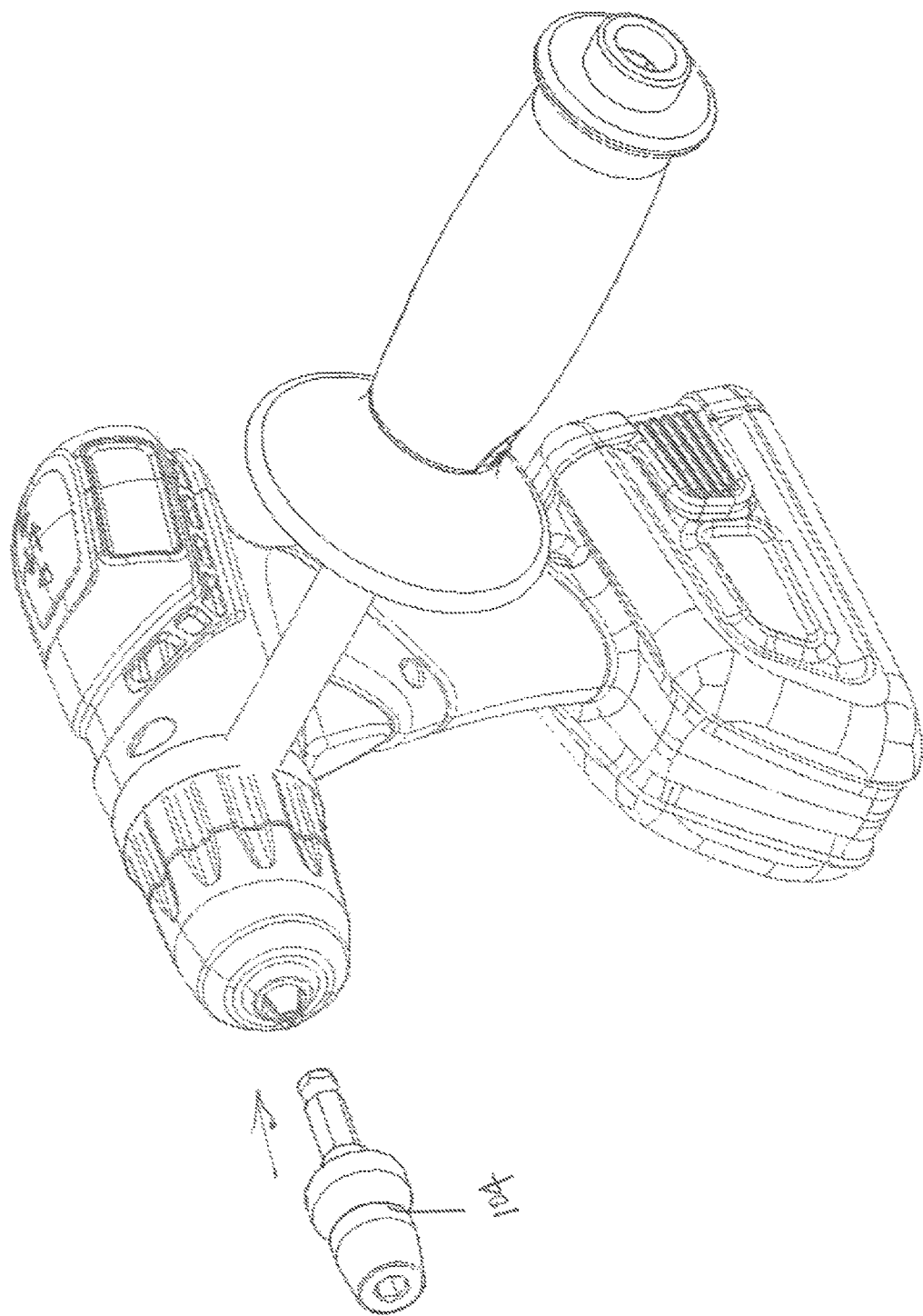

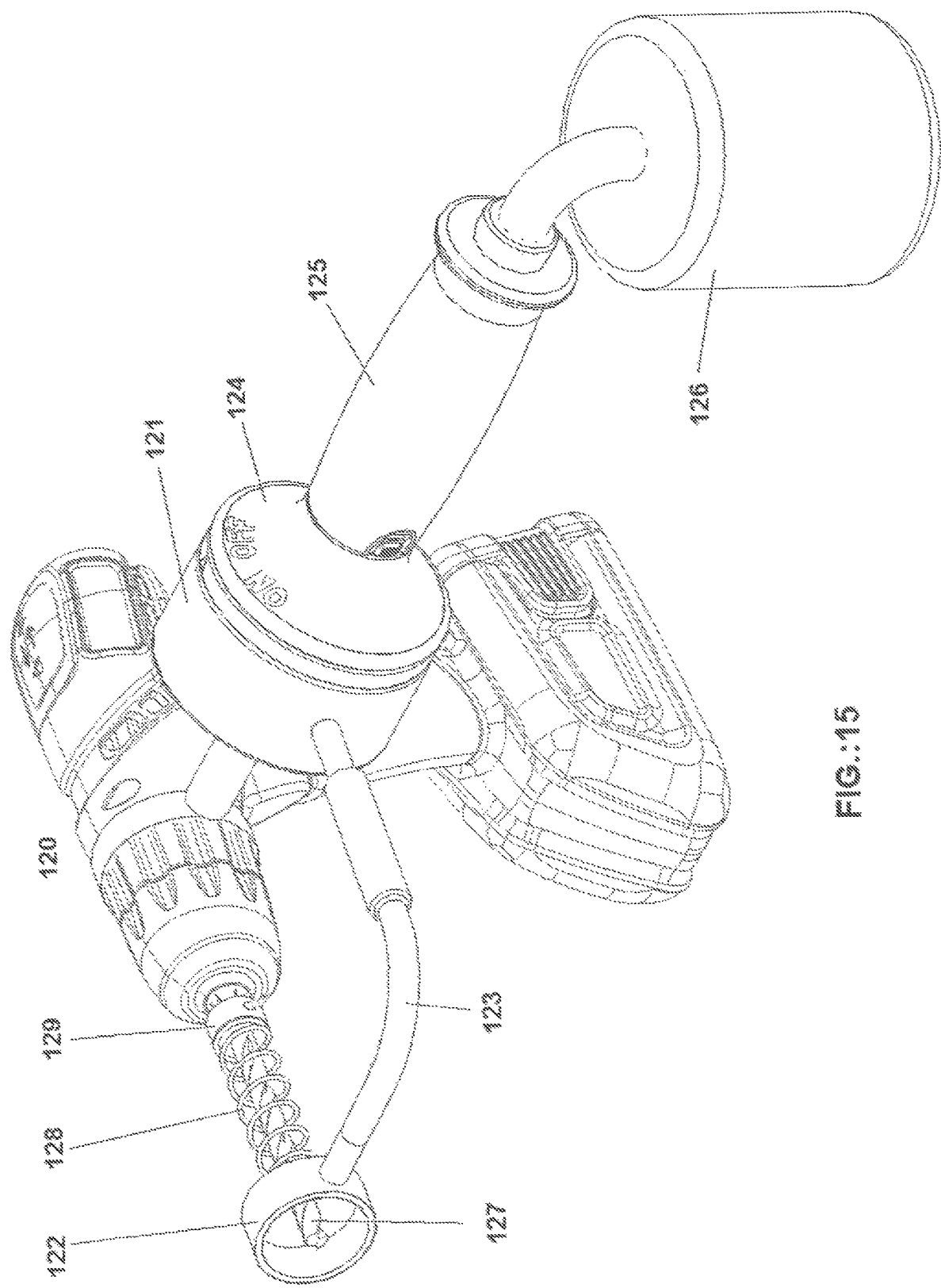

POWER TOOL WITH DETACHABLE AUXILIARY HANDLE

REFERENCE TO RELATED APPLICATION

This is a formal application based on, and claiming the benefit of, U.S. provisional patent application No. 62/277,261, filed on Jan. 11, 2016.

BACKGROUND OF THE INVENTION

This invention relates to power tools, and specifically to power tools having auxiliary handles, for example power drills having an auxiliary handle extending laterally therefrom.

It is an object of the invention to eliminate many separate tool-handling steps in fastening operations which previously required separate tools for drilling, and for securing the screw fastener in place or removing the burs from drilling, grinding operation. Other areas in which the present invention may be useful is in situations where the user is required to fasten articles with screws from a ladder, scaffold or the like where there is no convenient place to set down power tools such as drills, screwdrivers and the like. The present invention provides a combination tool which eliminates many of the handling steps previously required in such operations.

Heavy power drills or other power tools normally include pistol-shaped housings having a grip which is grasped by a user with one hand, and often an auxiliary handle grasped by the user's other hand, for two-handed operation so as to get better balance and control. Normally the auxiliary handle is secured to the housing, typically by screwing it into a threaded recess in the housing or by removably clamping to the drill housing, and functions strictly as an auxiliary handle, with no other function. Attaching or removing the auxiliary handle is not made simple.

In today's new age of compact light weight corded or cordless drills and impact drivers exceeding certain torque ratings, the auxiliary handles are used for safety reasons. UL standards now recommend these auxiliary handles as a mandatory requirement on tools exceeding certain torque value.

In view of the preceding, it would therefore be advantageous to develop a power tool combined with an auxiliary handle which is easy to install or remove, and which preferably provides additional functionality, instead of being just a handle.

SUMMARY OF THE INVENTION

It is therefore an object of the invention to provide a power tool with an auxiliary handle which is easily securable to and removable from the tool.

It is a further object, of preferred embodiments, for the auxiliary handle to provide additional functionality, beyond being merely a handle.

The auxiliary handle is detachably engaged to the power tool for working as a side handle, preferably via a "quick-connect" mechanism which locks the handle in place either automatically or with a simple movement (of a locking collar, for example), and which can be released by a simple movement (of a locking collar, for example).

Preferably, the handle serves a secondary function. For example, its quick-connect mechanism can be so configured as to receive a screwdriver bit. Thus when removed from the power tool, the handle can act as a screwdriver handle. The handle may include compartments or slots to retain a variety of screwdriver bits or other components. The handle could be a screwdriver with auto lock bit or bit holder.

In some examples, the quick-connect mechanism may be detachable from the driver handle, for insertion into the chuck of the power drill, so that the screws may be driven by the power drill, not just by hand with the handle.

With such examples, a user is able to drill a hole, then activate the quick-connect mechanism to release the handle from the tool, insert a bit in the quick-connect mechanism, and proceed to drive the screw, either by hand with the handle, or in some examples by opting to remove the quick-connect mechanism and inserting it in the chuck of the drill. For multiple screw locations, multiple holes can easily be drilled, and then screws can be driven into each hole by hand or with the power drill.

The principle of the invention can be adapted to other power tools such as power grinding tools, power saws (such as Sawzall brand reciprocating saws for example), power chisels, etc. For other such tools, it may be advantageous to provide the quick-connect/quick release aspect of the invention, regardless of whether or not the handle provides additional functionality. However, the handle may also provide additional functionality, such as operating as a screwdriver, or hand saw, or other desired function, and may be used to provide storage for any desired tool components or the like.

Further details of the invention will be described or will become apparent in the course of the following detailed description and drawings of specific embodiments of the invention, as examples.

BRIEF DESCRIPTION OF THE DRAWINGS

Embodiments of the invention will now be described, by way of example only, with reference to the attached drawings, in which:

FIG. 9 is a view of another alternative embodiment of the invention, wherein a tools or tool accessories carrier is shown; and FIG. 10 is another view of the alternative embodiment of FIG. 9, wherein the carrier is retracted from the handle;

FIG. 11A-11B is another embodiment of the invention, wherein the handle has a button to control the hand tool;

FIG. 12A-12B is another embodiment of the invention, wherein the auxiliary handle has the bit store function;

FIG. 14A-14B is another embodiment of the invention, wherein the auxiliary handle has another function switching accessory;

FIG. 15 is another embodiment of the invention, wherein the auxiliary handle has the function of sucking dust.

DETAILED DESCRIPTION OF THE INVENTION

Figure 1:
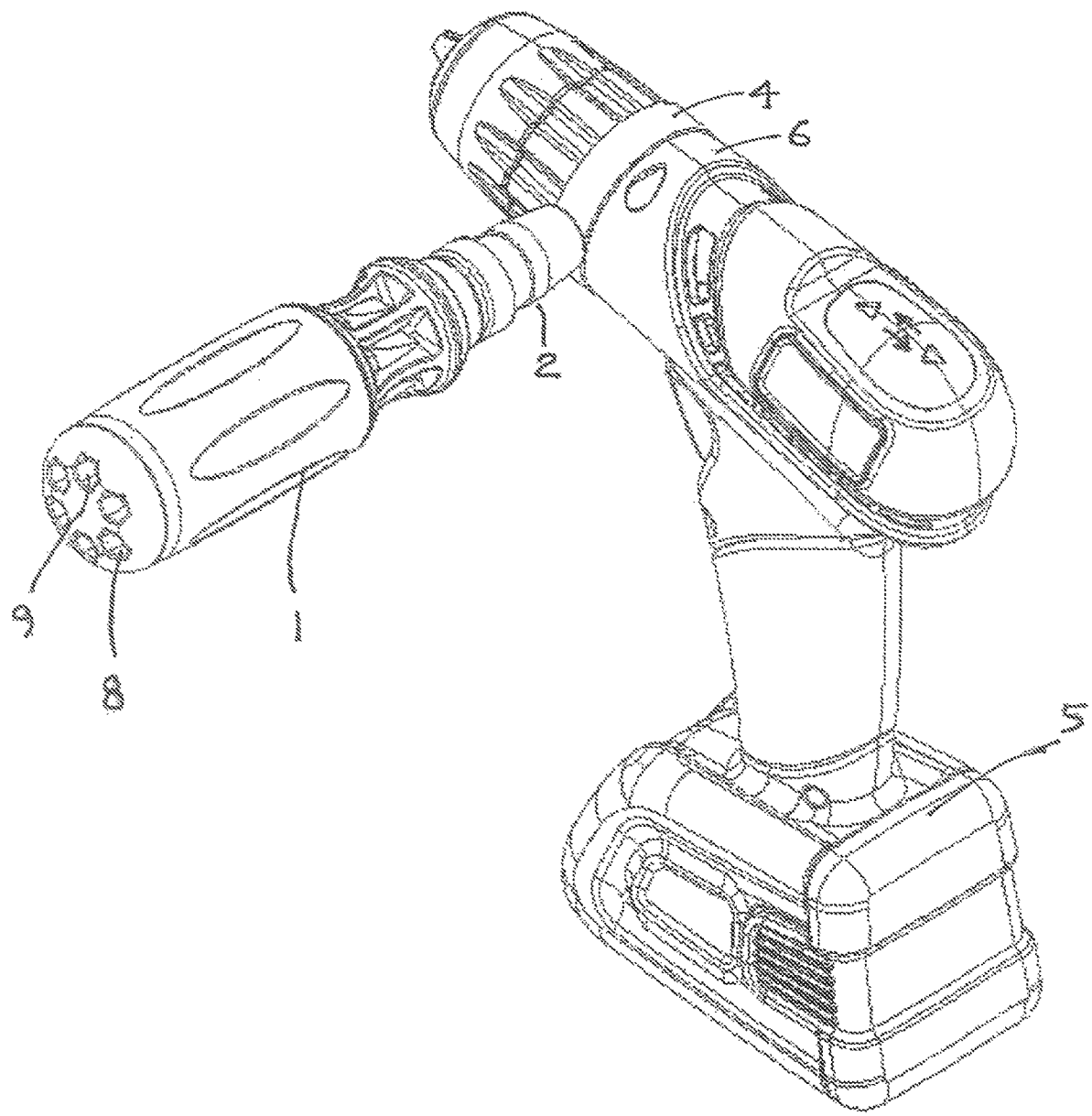
FIG. 1 is a view of first example of the invention.
Figure 2:
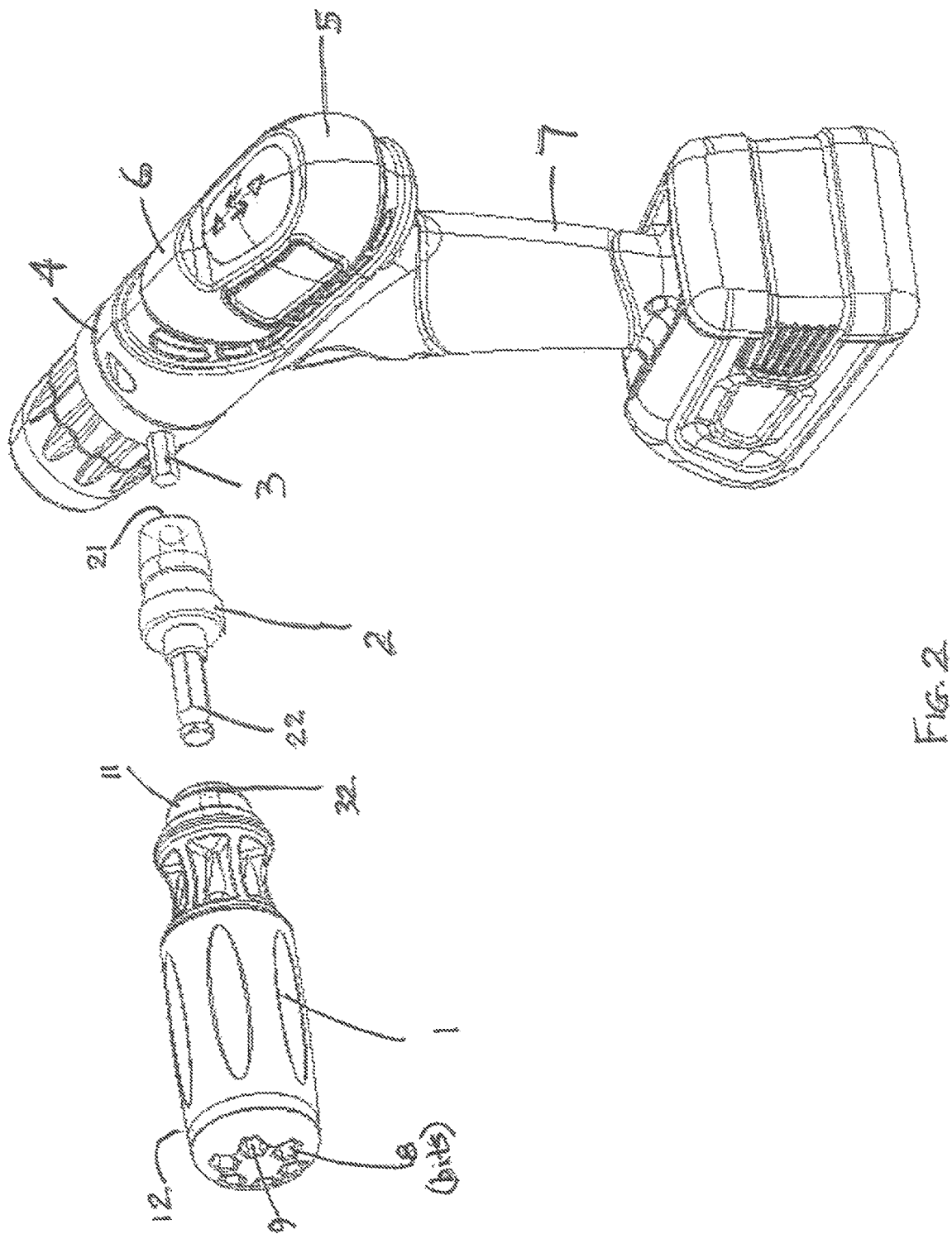
FIG. 2 is an exploded view of the device of FIG. 1.

A first example of the invention is illustrated in FIGS. 1 and 2. The housing of the power drill 5 has a bracket 4 detachably or permanently fixed on the housing 6. On the bracket 4, there is a handle mounting shank 3. An auxiliary handle 1 is releasably engaged to the handle mounting shank 3 by a quick-connect mechanism 2, and includes a fixed end 11 and a free end 12 for users to hold.

Preferably, the bracket 4 could be adjusted around the housing 6, so that the orientation of the handle mounting shank 3 can be varied relative to the output axis and so as to adjust the orientation of the auxiliary handle in order to accommodate various user handle orientation preferences (for example left-handed vs. right-handed).

In some embodiments, the quick-release mechanism may be permanently attached to the handle. However, preferably the auxiliary handle 1 has a central hole 32 in the fixed end 11, and the quick-connect mechanism 2 has a quick-connect shank 22 which extends into the central hole 32. The quick-connect mechanism is separable from the handle body 1, so that the quick-connect shank 22 can then be inserted in the chuck 16, and a screwdriver bit can be inserted in the quick-connect so that the power drill can be used to drive a screw with the screwdriver bit.

Optionally, there are detents (spring-ball detents for example) in the central hole 32 to releasably retain the quick-connect shank 22, or there could be a second quick-connect mechanism to retain the quick-connect shank 22. Alternatively, since there should be no axial forces in normal operation, there could be just a sufficiently tight friction fit to prevent the handle body from falling off. The shape of the handle shown in figures is generally cylindrical, however, it should be understood that a variety of geometries could be used to accomplish similar results.

The quick-connect mechanism 2 could be, for example, as described as in U.S. Pat. No. 6,695,321. However, any suitable quick-connect mechanism could be used in this invention.

The quick-connect mechanism 2 includes a central longitudinal hole 21 that can detachably engage the handle mounting shank 3, and a quick-connect shank 22 at second end facing the handle body 1. The central longitudinal hole 21 has a cross-section corresponding to the cross-section of the handle mounting shank 3. The quick-connect shank 22 has a cross-section corresponding to the cross-section of the central hole 32 of the auxiliary handle 1.

The cross-sections of the central longitudinal hole 21 and the quick-connect shank 22 of the quick-connect mechanism 2, the handle mounting shank 3 and the central hole 32 of the auxiliary handle 1 are hexagonal in the drawings. However, it should be understood that a variety of geometries could be used to accomplish a similar result.

To attach the auxiliary handle 1 to the power drill, the handle mounting shank 3 is engaged in the central longitudinal hole 21 of the quick-connect mechanism 2 and the quick-connect shank 22 of the quick-connect mechanism 2 is detachably engaged in the central hole 32 of the auxiliary handle 1.

As shown in FIG. 1 or 2, at the free end of the auxiliary handle 1, a plurality of channels 9 are formed within the handle for receiving and storing a plurality of tools or tool accessories 8 such as tool bits, drill bits, saw blades and so on, to be used with the power tool or the auxiliary handle 1. The channel 9 could have two ends that are finger-accessible by fingers to push tools in or pull tools out of the channel. The tools or tool accessories 8 in the handle could be removable and installed in the auxiliary handle or in the power tool, preferably with one hand. Storing the tools/tool accessories in the channel of the auxiliary handle 1 could also enhance the strength of the handle 1 and make the handle 1 stronger. The auxiliary handle may be of plastic, for example, and the tool accessories such as tool bits may be of metal and elongated, thus providing additional strength and rigidity.

When a hand tool is needed, the auxiliary handle 1 could be detached from the power tool by releasing the quick-connect mechanism 2. When the auxiliary handle is detached from the power tool with the quick-connect mechanism 2, it could be used as a quick-connect screw driver. When the auxiliary handle is detached from the power tool without the quick-connect mechanism 2, a bit from the channel 9 could be taken out and be inserted and locked directly into the central hole 32 of the handle 1 and the handle 1 could be used as a screw driver.

In this example, the auxiliary handle 1 is detachably connected with the quick-connect mechanism 2. The quick-connect mechanism 2 is not necessary detachable from the handle.

Optionally, the quick-connect mechanism 2 could be omitted and the handle could detachably be connected to the power tool by any normal mechanism.

Figure 3:
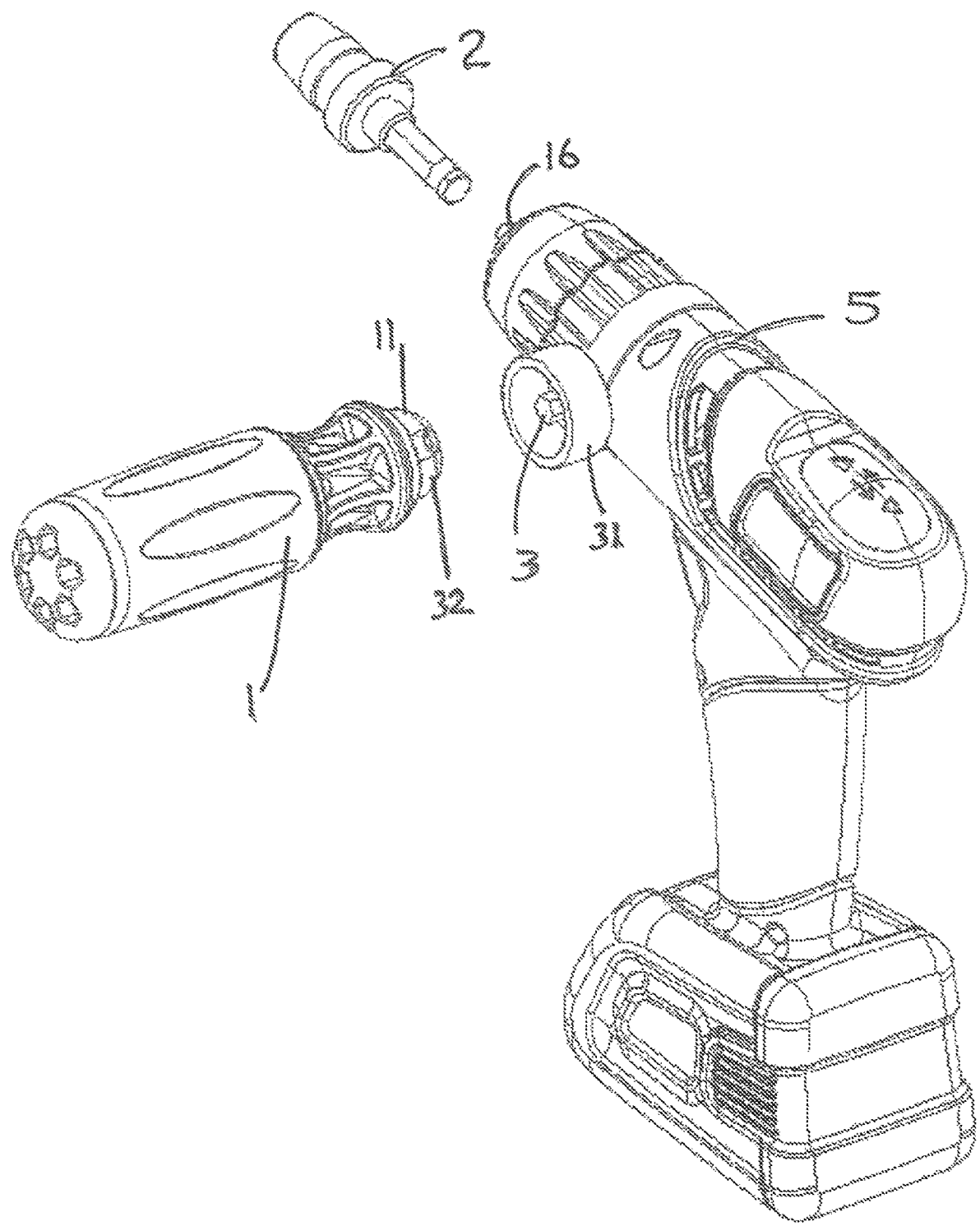
FIG. 3 is a view of an alternative embodiment of the invention, in which the quick-connect mechanism is separable from the handle.
Figure 4:
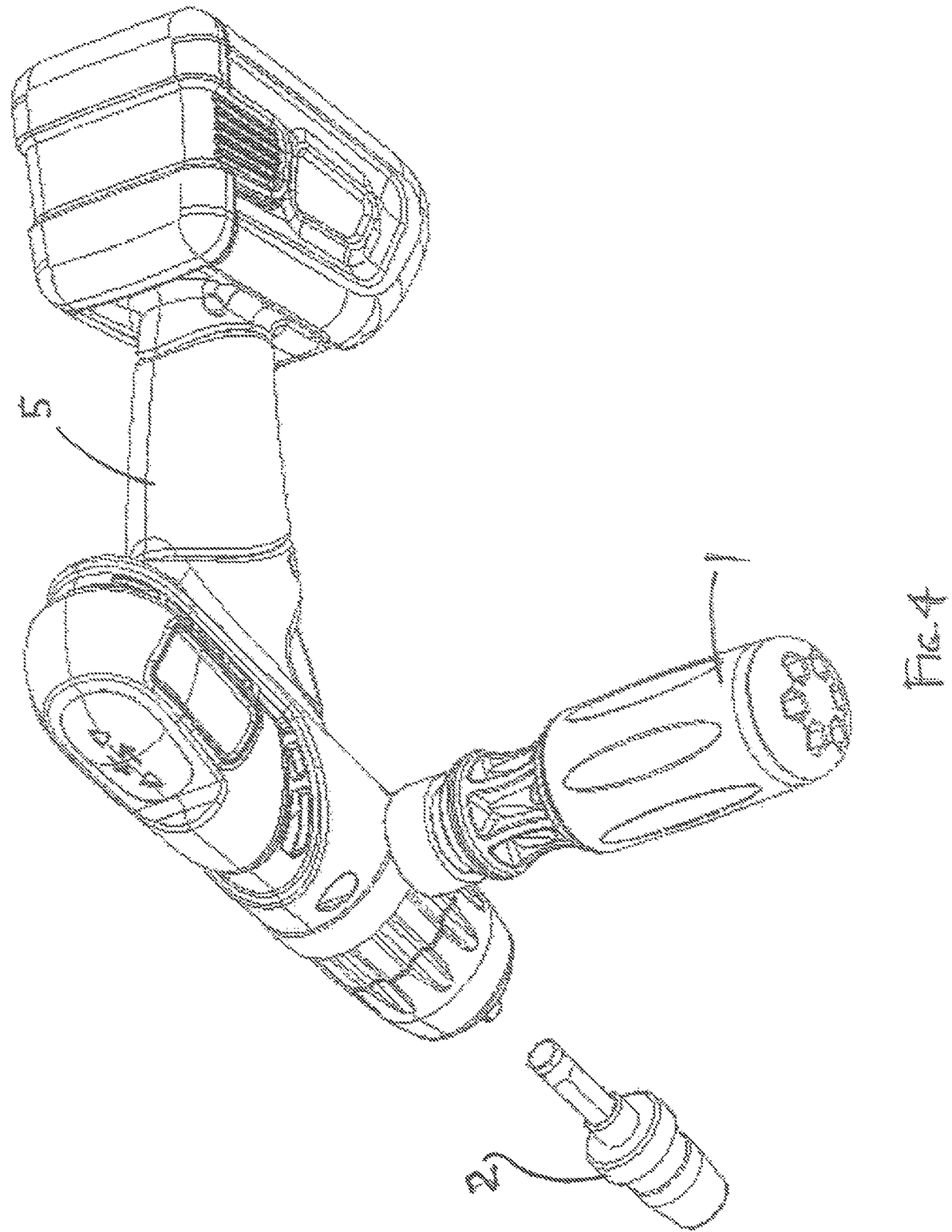
FIG. 4. is an exploded view of the device of FIG. 3.

Another example of the invention is illustrated in FIGS. 3 and 4. In this example, the auxiliary handle 1 is detachably engaged with the power tool 5 by a housing 31 on the power tool 5. The fixed end 11 of the handle could be insert in the housing 31 to engage the auxiliary handle 1 with the power tool. Optionally, the fixed end 11 could be screwed on the housing by screw threads or by any other means normally used in this area.

Optionally, a handle mounting shank 3 could also be used to engage with the central hole 32 on the handle 1 to help strengthen the engagement of the auxiliary handle 1 with the power tool.

The quick-connect mechanism 2 could also be used for coupling to the power tool output chuck 16, as shown in FIG. 3. In this situation, a tool such as a tool bit, drill bit or a similar device could be coupled to the rotary output shaft.

Figure 5:
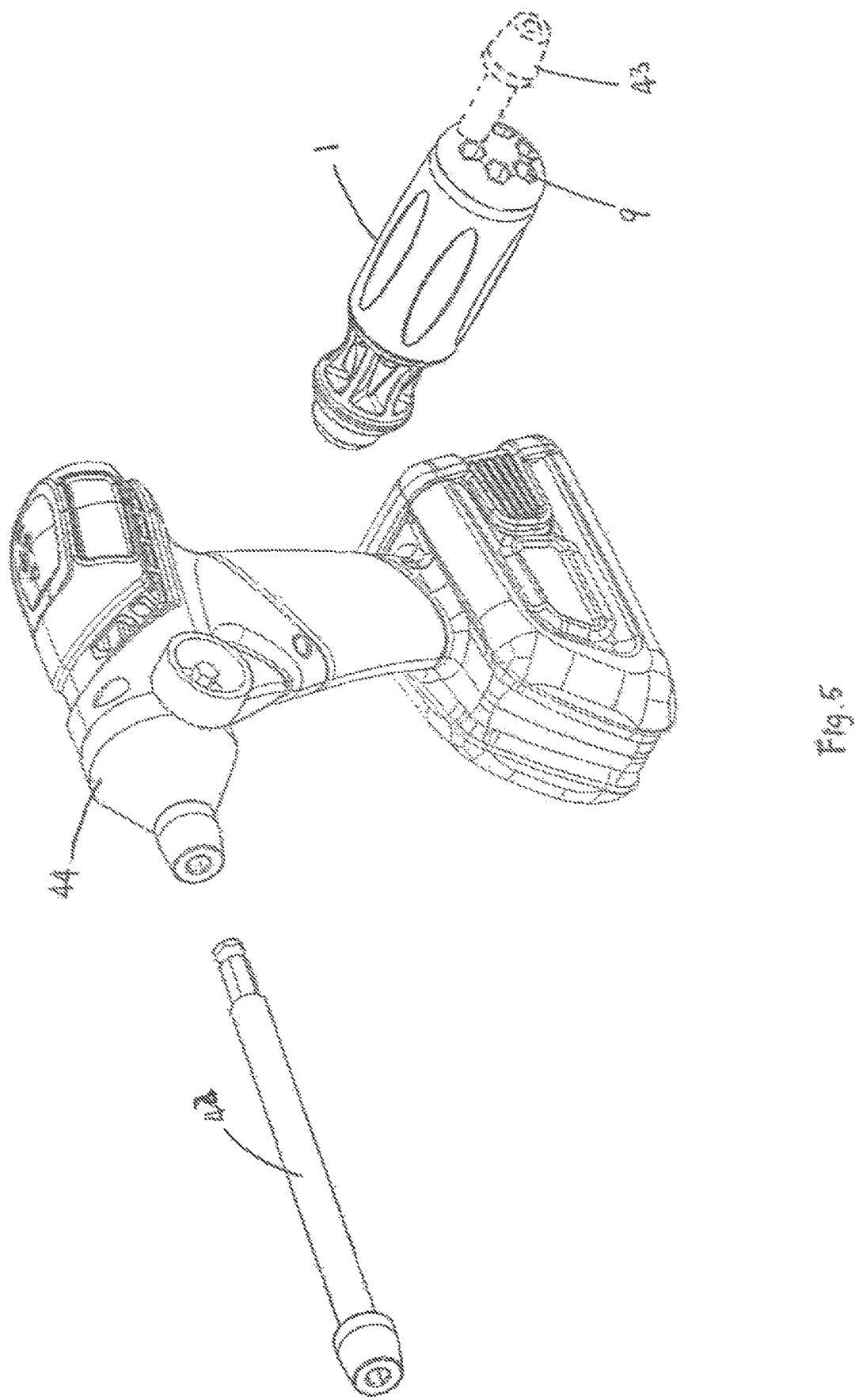
FIG. 5 is a view of alternative embodiment of the invention, wherein impact extension is included in stored in the auxiliary handle.

Optionally, the channel 9 could also be used to store impact extensions 43 as illustrated in FIG. 5. The power tool could be an impact driver 44 and the impact extension 43 could be used with the impact driver 44 as an impact hand tool. The impact extensions could also be used with the auxiliary handle 1 as an extended screw driver. Because the impact extension 43 is long, the strength of the auxiliary handle 1 could be enhanced dramatically by storing the impact extensions 43 in the channel 9.

Figure 6:
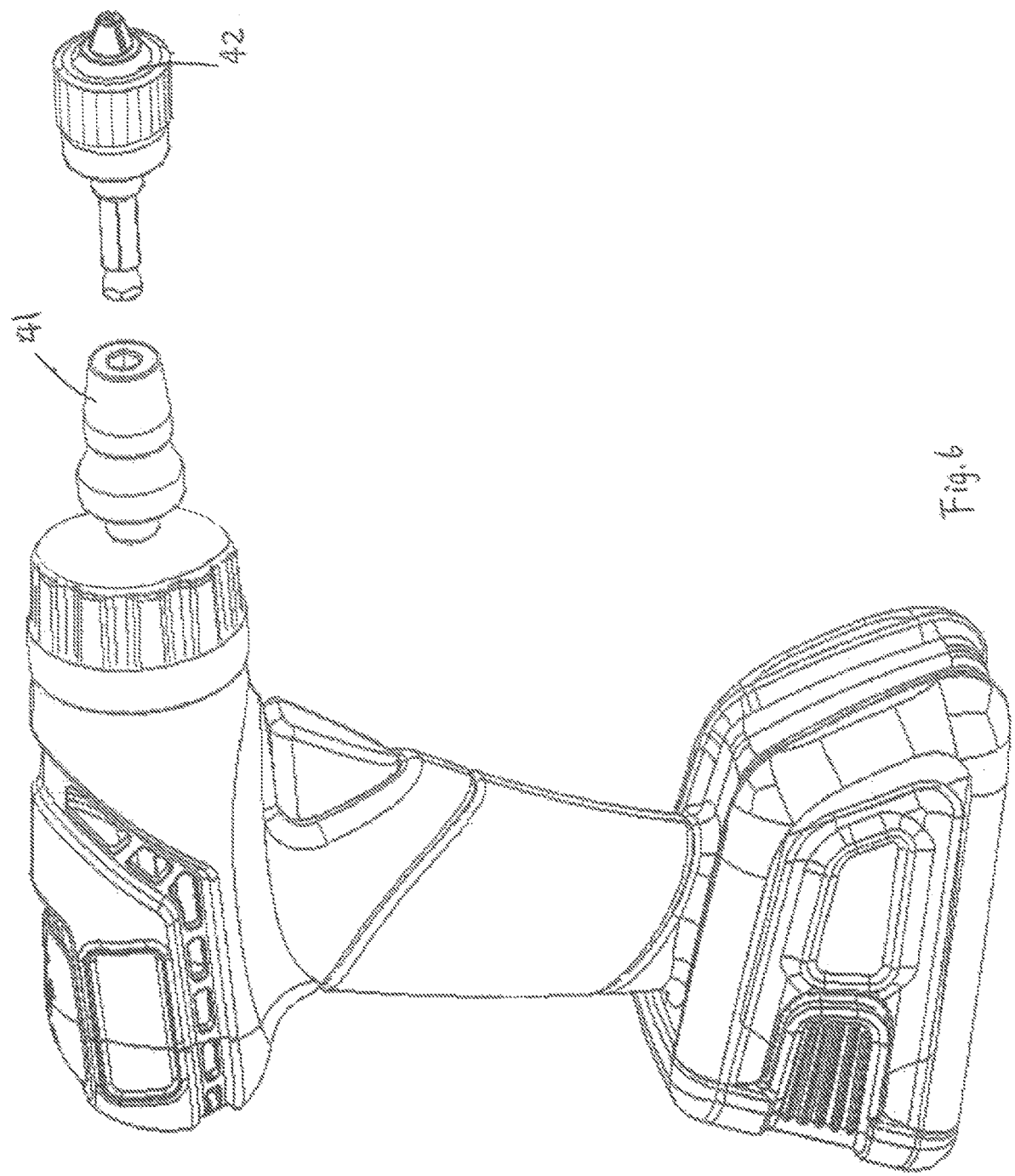
FIG. 6 is a view of power tool with built in quick connect mechanism.

Alternative, the power tool output could include a built-in quick-connect mechanism 41 for mounting tool bits, as shown in FIG. 6. A 3-jaw drill chunk 42 could also be connected with the quick-connect mechanism 41 for using a round shaft bit or tool accessories on the power tool.

Figure 7:
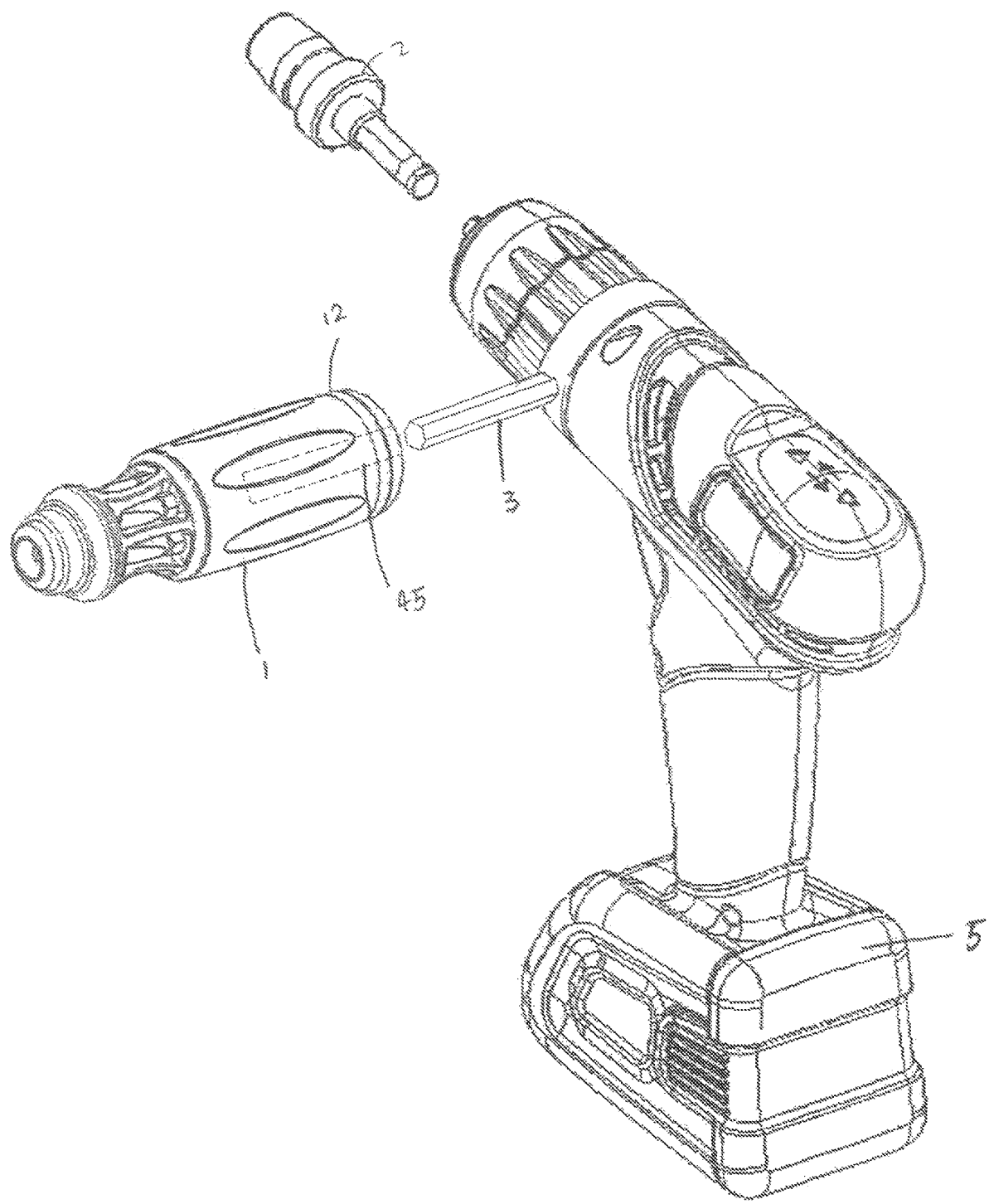
FIG. 7 is a view of third embodiment of the invention, in which the auxiliary handle is detachable connect with power tool at the free hold end.

A third example of the invention is illustrated in FIG. 7. In this example, the free end 12 for users to hold of the auxiliary handle 1 is releasably engaged to the handle mounting shank 3 of the power drill. In this example, the free end 12 includes a central hole 45, which can be engaged with the mounting shank 3.

Because of connecting by the free end 12, the mounting shank 3 could be long and extend all the length of the auxiliary handle 1, therefore the engagement of the auxiliary handle land the power tool 5 could be stronger and stabler.

The free end 12 could be engaged with the mounting shank 3 by any normal mechanical means. For example, the free end 12 could include a quick connect mechanism in the central hole 45 to engage with the mounting shank 3.

Figure 8:
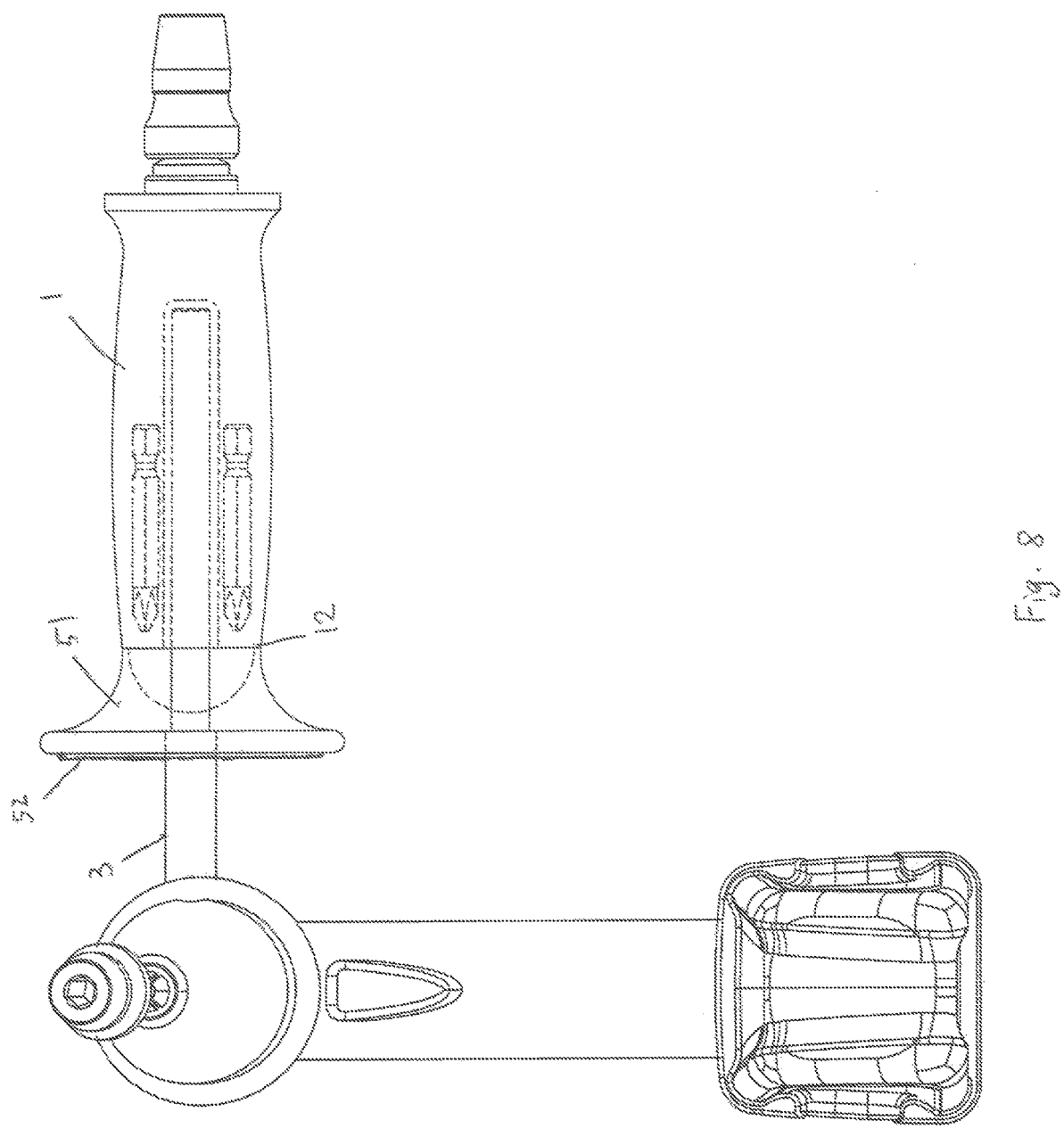
FIG. 8 is a view of alternative embodiment of the invention, wherein a handguard is included.

Optionally, a hand guard 51 could also be included at the free end 12 of the auxiliary handle 1, as shown in FIG. 8. The hand guard 51 could protect the hand against heat or abrasive material from the power tool operation.

The handguard 51 could be detachable installed on the mounting shank 3 too. Optionally, one side of the handguard 51 could include an abrasive layer 52 for deburring. This could add more functions to the invention.

Optionally, the auxiliary handle 1 could include a tools or tool accessories carrier 53 for holding and access the tool accessories, as shown in FIGS. 9 and 10. The carrier 53 could hold the tools or tool accessories 53 in the handle 1 as shown in FIG. 9 and the carrier 53 is retractable from the handle for accessing the tools or tool accessories stored in the handle as shown in FIG. 10.

From the description, it can be seen that the tools in the invention could be used in different ways and the power tool could have different functions.

A fourth example of the invention is illustrated in FIGS. 11A and 11B. In this example, the power tool is a hammer drill 120 and it can be used in a much more efficient manner. The auxiliary handle has different mode settling that are lockable selectable without shifting hand/grip. The hand power tool can be in a drilling mode. By pressing a lock/unlock button 101, the mode can be changed from drilling as in FIG. 11A to hammer drilling mode in FIG. 11B. Alternatively, the mode could be switched from drilling to tapping.

Figure 12A:
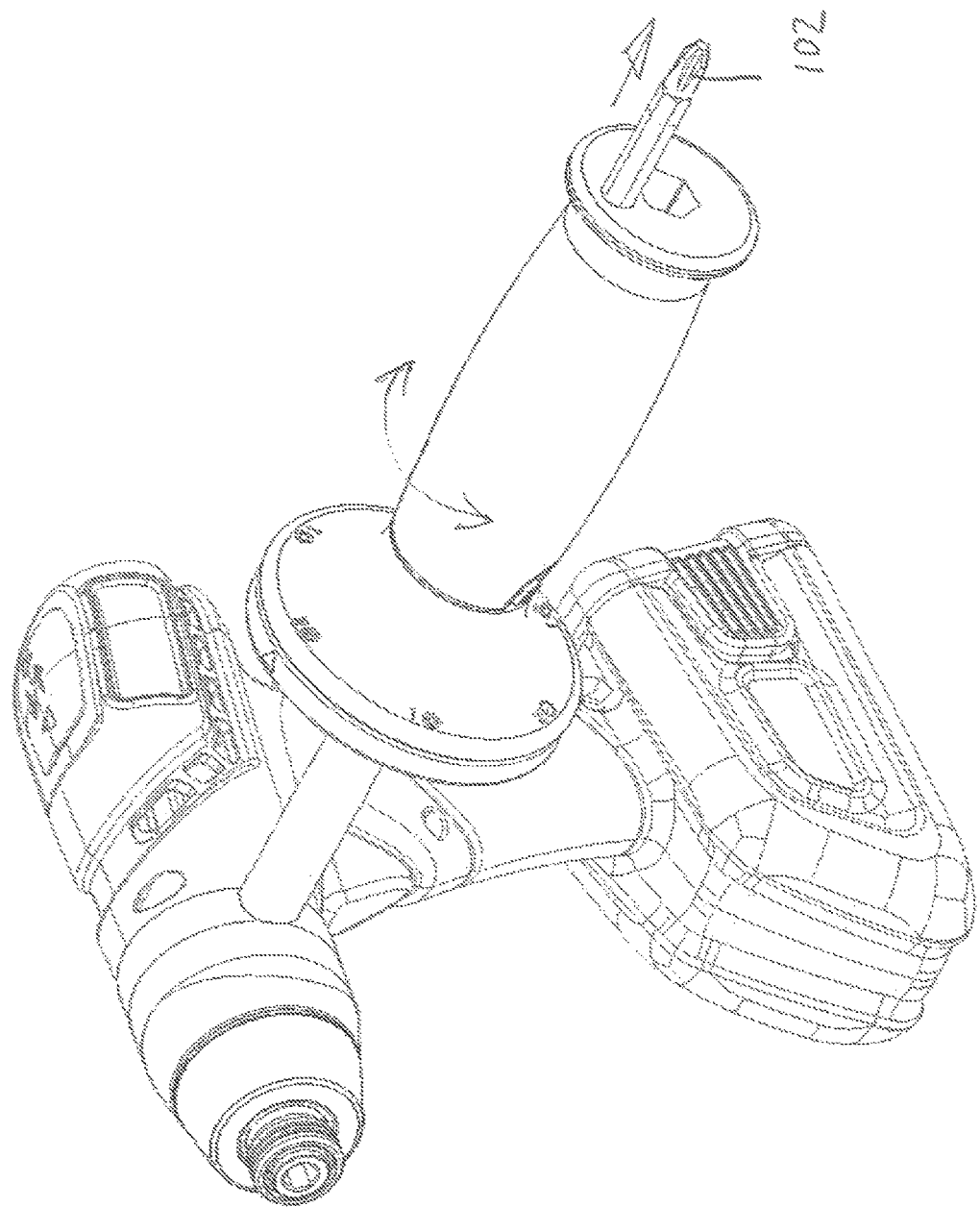

The fifth example of the invention is illustrated in FIGS. 12A and 12B. In this example, the auxiliary handle has an added feature/function to deploy required tool bits from a specific project within the handle. These bits/tools are 102 indexably selectable by rotation and locking the auxiliary handle in desired position. FIG. 12B shows the bit 102 loaded into tool spindle for application.

Figure 13A:
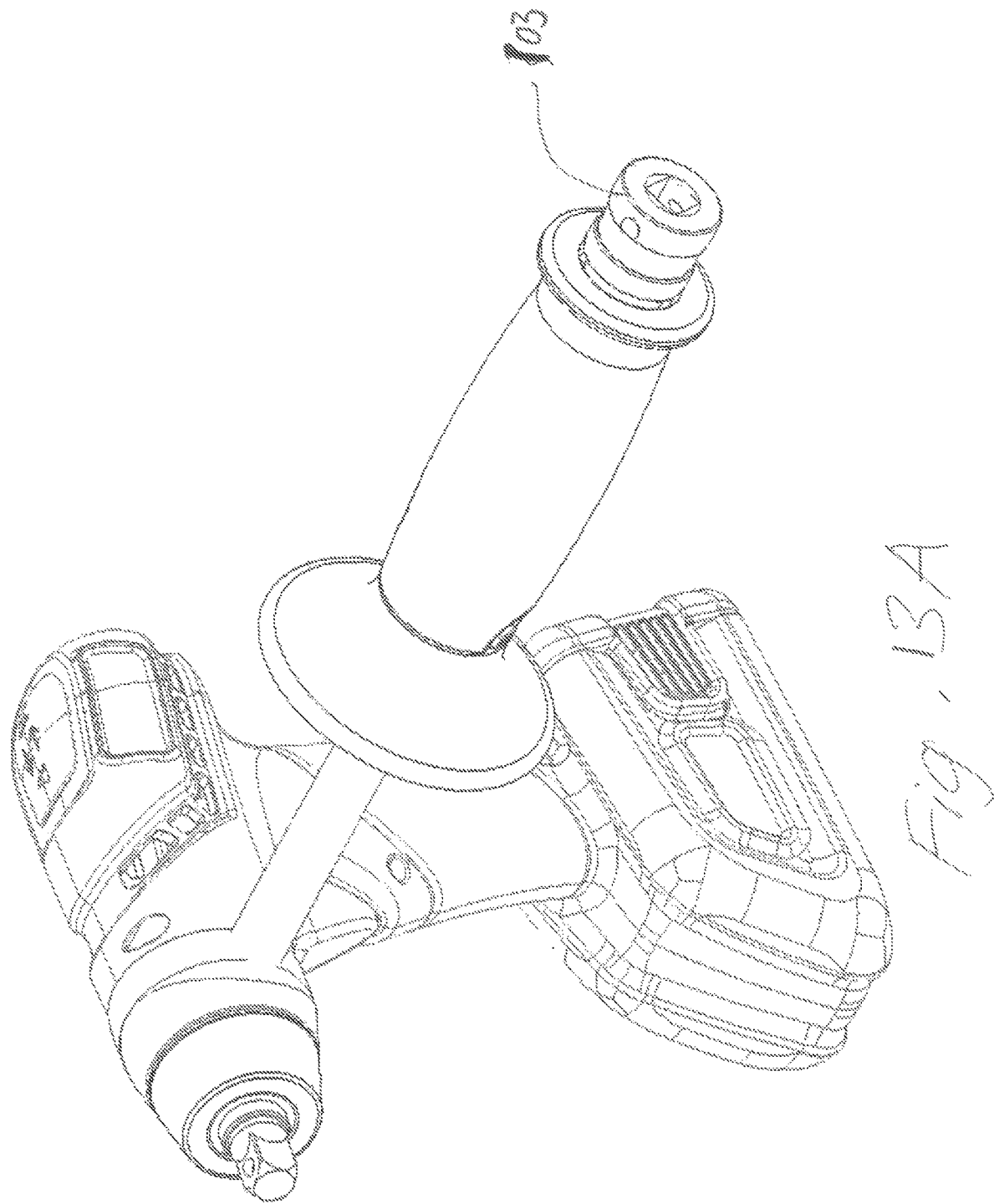
FIG. 13A-13B is another embodiment of the invention, wherein the auxiliary handle has a function switching accessory.
Figure 13B:
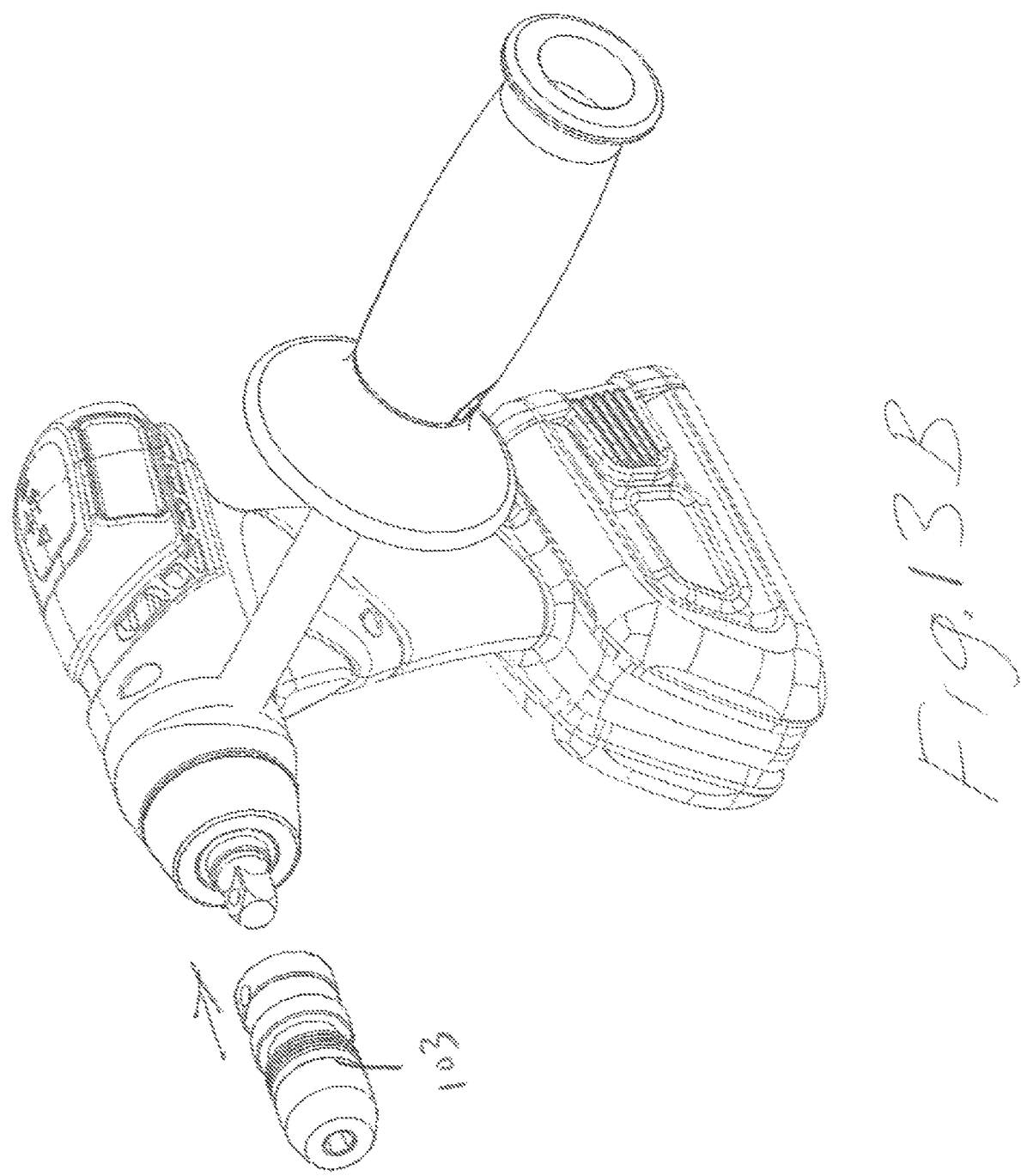

The sixth example of the invention is illustrated in FIGS. 13A and 13B. In this example, the power tool is an impact wrench with auxiliary handle. The handle deploys a function switching accessory 103 locked within. In FIG. 13B, the accessory 103 is being attached to the end of power tool spindle to convert this impact wrench to impact driver with quick bit change feature.

Figure 14A:
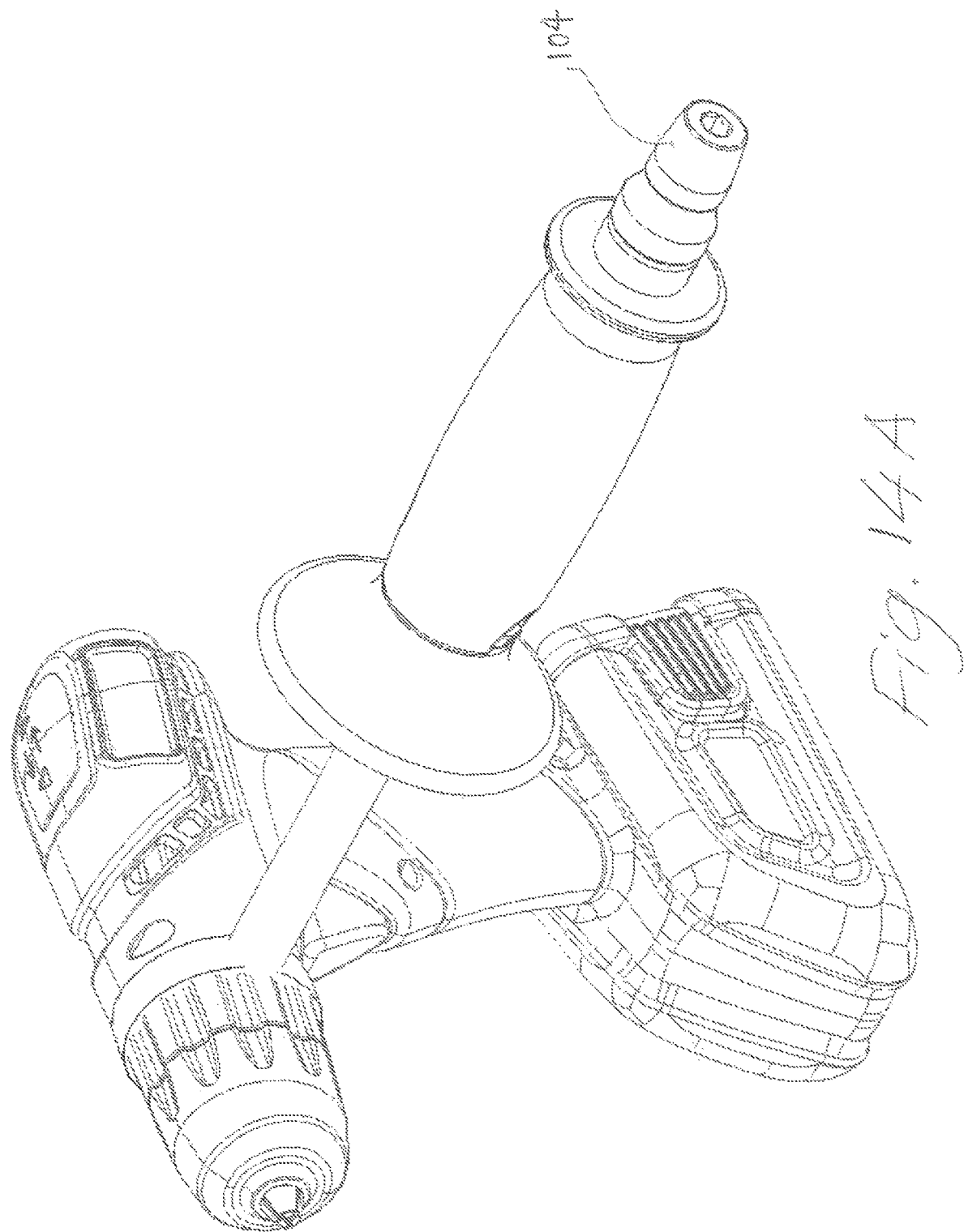

The seventh example of the invention is illustrated in FIGS. 14A and 14B. In this example, the power tool is a drill with three jaw chuck and auxiliary handle. The handle deploys a function switching accessory 104. As shown in FIG. 14B, the accessory being chucked into drill for converting its application from drilling to driving.

The eighth example of the invention is illustrated in FIG. 15. In this example, the power tool is a power drill 120 and the auxiliary handle 125 has additional function of collecting dust from drilling. As shown in the FIG. 15, a power drill has an adjustable lock bushing 129 to lock drill bit 127. A sucking cup 122 is connected to the bushing 129 through a compression spring 128. A sucking unit 121 (normally a fan) is set on the front of the auxiliary handle 125 and the sucking unit 121 is connected to the suction cup 122 through telescoping pipe 123. A dust collector 126 is attached to the end of the auxiliary handle 125. The sucking unit 121 and the dust collector 126 are connected through the hollow chamber of the auxiliary handle 125. A dial 124 is set on the auxiliary handle 125 shows selectable positions ON/OFF to control the suction unit 121 on or off. While the power drill works, and by using the dial 124 to turn on the suck unit 121, the dust from drilling will be sucked by power of the suck unit 121 from the suction cup 122 and then to the sucking unit 121 through the telescoping pipe 123 and then enter the dust collector 126 through chamber on the auxiliary. All the dust from drilling could be collected in the dust collector 126, which can be empty when it is full. With this structure, dust collecting can be simplified and be easy to handle during the drilling operation.

It will be evident to those knowledgeable in the field of the invention that many variations on the examples described above are conceivable within the scope of the invention. It should therefore be understood that the claims which define the invention are not restricted to the specific examples(s) described above. Possible variations include, for example, the orientation of the handle mounting shank 3 can be varied relative to the output axis and to adjust the orientation of the auxiliary handle to accommodate various user handle orientation preferences (for example left-handed vs. right-handed).

Further variations may be apparent or become apparent to those knowledgeable in the field of the invention, within the scope of the invention as defined by the claims which follow. For example, the auxiliary handle could be detachably engaged with the power tool by any mechanism and the quick-connect mechanism could be omitted.

The invention claimed is:

1. A power tool and auxiliary handle combination, wherein the auxiliary handle is releasably engaged to a handle mounting shank on the power tool by a quick-connect mechanism, when the auxiliary handle is detached from the power tool with the quick-connect mechanism, it could be used as a quick-connect hand tool; the auxiliary handle has a hole, and the quick-connect mechanism has a quick-connect shank which extends into the hole; the quick-connect mechanism is separable from the auxiliary handle and the quick-connect shank can then be inserted in the power tool chuck as quick bit change device.

2. A power tool and auxiliary handle combination, wherein the auxiliary handle is removable from the power tool; the auxiliary handle includes a dust collecting unit for collecting dust from drilling or cutting; the power tool has an adjustable lock bushing to lock a cutting tool and a suction cup is connected to the bushing.

3. A combination as in claim 2, wherein the suction cup is connected to the bushing through a compression spring.

4. A combination as in claim 2, wherein the dust collecting unit is set on the front of the auxiliary handle and the dust collecting unit is connected to the suction cup through a pipe.

5. A combination as in claim 2, wherein the dust collecting unit is attached to the end of the auxiliary handle.

6. A combination as in claim 2, wherein the dust collecting unit and the suction cup are connected through a hollow chamber on the auxiliary handle.

7. A combination as in claim 2, wherein a dial is set on the auxiliary handle to control the dust collecting unit.

8. A combination as in claim 2, wherein the auxiliary handle is releasably secured to the power tool at the free end of the handle.

9. A combination as in claim 2, wherein a hole is set at the fixed end of the auxiliary handle for holding a tool accessory or quick connect mechanism.

10. A combination as in claim 2, wherein a quick connect mechanism is included at the fixed end of the auxiliary handle.

* * * * *